Oct. 15, 1946.  J. W. LEONARD  2,409,572
MANUFACTURE OF SULPHAMIC ACID
Filed Nov. 6, 1943
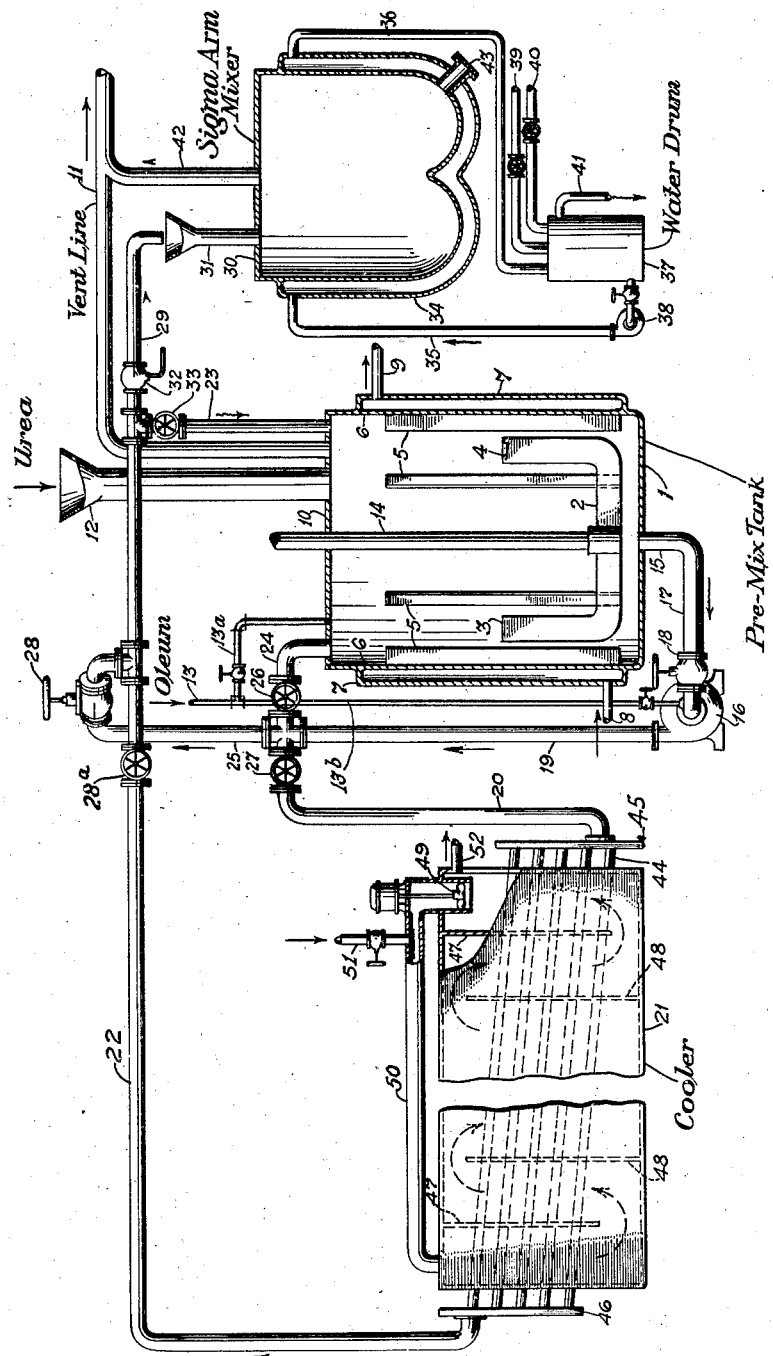
INVENTOR.
James W. Leonard
BY George Johannesen
ATTORNEY Patented Oct. 15, 1946

2,409,572

UNITED STATES PATENT OFFICE 2,409,572

MANUFACTURE OF SULFAMIC ACID

James W. Leonard, Westfield, N. J., assignor to E. I. du Pont de Nemours & Company, Wilmington, Del., a corporation of Delaware Application November 6, 1943, Serial No. 509,213

5 Claims. (Cl. 23—166)

This invention relates to the manufacture of sulfamic acid and is directed to processes in which a liquid reaction mixture is prepared by bringing together urea and oleum of about 45 to 53% strength in a recycled body of pre-reaction mixture in the proportions to give substantially one mole of sulfuric acid for each mole of urea, dissipating the heat of the reaction as required to inhibit the formation of sulfamic acid and to keep the reaction mass in the liquid state, recycling a portion of the pre-reaction mixture and heating the remainder as required to convert it to sulfamic acid.

It has been heretofore known that sulfamic acid can be produced from urea, sulfur trioxide and sulfuric acid. See U. S. Patent 2,102,350, German Patent 636,329, German Patent 641,238, and U. S. Patent 2,191,754. It is known that the reactions involved are strongly exothermic and that precautions must be taken to insure adequate dissipation of the heat of the reaction which otherwise might proceed with undue violence. According to German Patent 641,238 it is proposed to add urea to oleum slowly and with cooling and thereafter to heat the reaction mixture to cause the sulfamic acid to precipitate. To effect this result an excess of sulfuric acid is utilized. Thus whereas the theoretical proportions are one mole of urea to one mole of sulfuric acid to one mole of sulfur trioxide, Example 1 of German Patent 641,238 utilizes sulfuric acid in the proportion of five times the theoretical and sulfur trioxide in the proportion of three times the theoretical. Thus the sulfuric acid is substantially in excess of both the theoretical amounts of urea and sulfur trioxide and as a result the reaction is carried out throughout in a liquid phase and the resulting sulfamic acid is precipitated in this liquid medium.

Because of the difficulties encountered in separating crystals of sulfamic acid from strong sulfuric acid solutions it is desirable so to proportion the constituents that the final product is obtained as a dry product. Thus if the theoretical proportions are utilized, theoretically at least there should be obtained sulfamic acid as such. In practice, however, it is found that this is not necessarily the case because there are other reactions, which take place especially if the temperature is allowed to become too high, which result in other products such as ammonium bisulfate. Also, because of the difficulty of dissipating the heat of the reaction it is difficult if not impossible by ordinary methods to obtain any product at all if the combining proportions of the reagents are utilized.

By combining urea and oleum of at least 45% strength under conditions adapted to inhibit the formation of sulfamic acid there may be obtained a wet pre-reaction mixture which on subsequent heating will convert to sulfamic acid as a dry product. But because of the complexity of the reactions which are possible between urea, sulfur trioxide and sulfuric acid and because of the exothermic character of these reactions it is difficult to obtain uniform results, to prevent the reaction from proceeding too violently and to obtain high yields of sulfamic acid. Apparently small differences in operating procedures have been observed to effect substantially the yield of sulfamic acid obtainable by the process.

I have found that a stable and uniform pre-reaction mixture which may be converted to dry sulfamic acid simply on heating may be obtained by bringing urea and oleum of 45-53% strength together in a liquid reaction medium made up of recycled pre-reaction mixture in the proportions to give substantially one mole of sulfuric acid for each mole of urea, dissipating the heat of the reaction as required to inhibit the formation of sulfamic acid and to keep the reaction mass liquid, recycling a portion of the liquid pre-reaction mixture and heating the balance as required to convert it to sulfamic acid.

The general reaction and other aspects of the subject matter herein described are disclosed in various co-assigned cases. The relationship between these cases will be more evident by the following brief summary of the subject matter each case covers.

A co-assigned application, Serial No. 471,743, relates to a process for making sulfamic acid which comprises the steps of adding urea, sulfuric acid, and sulfur trioxide to a solid particulate diluent while agitating the diluent, the rate of addition being such that the reaction mass remains apparently dry and particulate thruout the reaction.

A co-assigned application, Serial No. 509,281, relates to a process in which sulfamic acid is first mixed with urea to form a paste and then sulfuric acid and sulfur trioxide are added in the proportions of substantially one mole of sulfuric acid and at least one mole of sulfur trioxide for each mole of urea while cooling the mass to inhibit formation of sulfamic acid and to give a wet reaction mass, and thereafter heating the wet reaction mass to convert it to dry sulfamic acid.

A co-assigned application, Serial No. 509,276, is directed to processes comprising the steps of bringing together urea and oleum of at least 45 per cent strength in a liquid reaction medium made up of one or more of the components of the reaction in the proportion to give substantially one mole of sulfuric acid for each mole of urea while cooling the reaction medium to keep it liquid, and thereafter converting the liquid mass to sulfamic acid.

The present application relates to improved processes in which urea and oleum of at least 45 per cent and not more than 53 per cent are brought together in the proportions to supply substantially one mole of sulfuric acid for each mole of urea while cooling to suppress the formation of sulfamic acid whereby a body of liquid is obtained. A portion of this main body of liquid is withdrawn, cooled, and returned to the main body of liquid, the rate of withdrawal of liquid from the main body of liquid and the degree of cooling of the withdrawn portions being such that the main body of liquid is maintained in a continuous liquid phase and the formation of sulfamic acid is suppressed. The liquid thus formed may be withdrawn and heated to convert it to sulfamic acid.

By the processes of my invention I obtain all the advantages which can be attributed to a process for producing the product dry and also the advantage of the high cooling efficiency which can be obtained with a liquid medium and at the same time I obtain yields which have not heretofore been possible in the manufacture of sulfamic acid from oleum and urea. By bringing the urea and oleum together in the manner, concentration and proportion set out in a recycled body of liquid pre-reaction mixture I am able easily and effectively to dissipate the heat liberated during the pre-mix stage and so to maintain a uniform temperature throughout the reaction mass and to obtain thereby uniform results. In this pre-mix stage certain preliminary reactions, which are believed to consist mainly in the reaction of sulfur trioxide with urea to form carbamido monosulfonic acid, take place with an abundant evolution of heat. The total heat of the sulfamic acid reaction therefore is largely dissipated in the pre-mix state where effective cooling may be maintained. Such residual heat of reaction as may be left in the conversion of the carbamido monosulfonic acid is not sufficiently great to complicate the conversion of the pre-reaction liquid to dry sulfamic acid.

In carrying out the processes of the invention I first form the liquid pre-reaction mixture and thereafter utilize it by recycling either intermittently or continuously according to the manner in which the process is carried out as the liquid reaction medium in which the pre-mix reaction between urea and oleum is carried out. The pre-reaction mixture is subjected to agitation and cooling and the reagents, urea and oleum, are introduced in a manner and at a rate consistent with obtaining and maintaining the desired suppression of the sulfamic acid-forming reaction throughout. The rate of addition of the reagents, the rate of agitation and the efficiency of the cooling all contribute to obtaining this result and must be carefully balanced one against the other in order to prevent such local over-heating as might cause the pre-mix reaction to get out of control and to proceed spontaneously.

The pre-reaction mixture is made up initially by gradually introducing the urea into oleum with suitable cooling and agitation. Once a sufficient quantity of this pre-reaction mixture is prepared the urea and oleum may be gradually introduced into it in the proper proportions while effecting the necessary cooling and agitation to suppress the sulfamic acid-forming reaction. The body of pre-reaction mixture thus built up acts as an efficient heat transfer medium. The heat of the reaction of the oleum and urea is transferred into this body of pre-reaction mixture which in turn as it is brought into contact with a suitably cooled surface, as by agitation or otherwise, transfers the heat of the reaction to an external coolant. Agitation of the pre-reaction mixture serves not only the purpose of bringing it into contact with a suitable cooled surface but also of dispersing the reagents, that is, the oleum and urea, throughout the mass thereby diluting in effect the heat of the reaction. This is facilitated by gradually introducing the reactants so as to allow adequate dispersion and adequate dissipation of the heat of the reaction. The rate at which the reagents are added, therefore, will be dependent upon the ability of the particular apparatus involved to dissipate the heat of the reaction and the maximum rate may easily be determined as that at which the temperature becomes excessive or the pre-reaction mixture becomes too thick for agitation, that is, becomes a paste rather than a liquid.

Suitable apparatus for carrying out the processes of the invention is illustrated diagrammatically in the accompanying drawing. In this drawing 1 is the pre-mix tank, 2 is a U-shaped agitator paddle having the upright arms 3 and 4 juxtaposed to the fins 5 which project inwardly from the walls 6 of the pre-mix tank. The walls 6 are provided with a water-jacket 7 having inlet and outlet means 8 and 9, respectively, for circulating a cooling medium about the walls 6 of the pre-mix tank. The fins 5 serve the two-fold purpose of intensifying the agitation in the pre-mix tank 1 and of increasing the cooling efficiency.

The pre-mix tank 1 is provided with a cover 10 so that any $SO_3$ evolved in the pre-mix reaction may be recovered through the vent line 11. 12 is a chute leading through the cover 10 for introducing urea. 13 is the oleum feed with branch 13a leading through the cover 10 and branch 13b leading to the inlet of circulation pump 16. 14 is the shaft of the agitator paddle 2.

Adjacent the bottom of the pre-mix tank 1 there is an outlet 15 connected with the low-pressure side of pump 16 through the line 17 and valve 18. The high-pressure side of the pump 16 communicates through lines 19 and 20 with the cooler 21 which in turn communicates through lines 22 and 23 with the pre-mix tank 1. By this arrangement pre-reaction mixture from pre-mix tank 1 is withdrawn through the cooler 21 and re-introduced into the pre-mix tank through line 23. Lines 24 and 25 are by-pass lines by means of which the pre-reaction mixture may be by-passed the cooler 21 by suitable manipulation of valves 26, 27, 28, 28A, 32 and 33.

Also, communicating with line 22 is line 29 which carries pre-reaction mixture to the Sigma-arm mixer 30 through the inlet means 31. This inlet means is of the oscillating funnel type and feeds the pre-reaction mixture over a ¼-inch mesh screen (not shown) to obtain uniform distribution. The amount of pre-reaction mixture so introduced into the Sigma-arm mixer is determined by the adjustment of valves 32 and 33. The Sigma-arm mixer is provided with a water-jacket 34 connected in a closed circuit by lines 35 and 36 with the water drum 37. Circulation of water in this circuit is maintained by the pump 38. The water drum 37 is provided with inlets 39 and 40, one of which is connected with cold water and the other of which is connected with steam, so that the temperature of the water circulated through the water-jacket 34 may be regulated and maintained at the desired temperature. Surplus water flows out the overflow means 41. The Sigma-arm mixer is provided with a vent 42 so that any sulfur trioxide liberated may be recovered and is provided with outlet means 43 for discharging the product.

The cooler 21 consists of a plurality of tubes 44 connected in parallel by means of the headers 45 and 46 which communicate respectively with lines 20 and 22. The cooler is divided by baffle plates 47 and 48 so arranged as to cause the water to flow in a tortuous path from one end of the cooler to the other. In the last compartment the pump 49 elevates the cooling water to the line 50 and returns it to the initial compartment. The temperature of the cooling water is maintained by introducing cold water through the inlet 51 into the line 50 and allowing the surplus water to leave through the overflow means 52 located in the last compartment above the pump 49.

The invention may be more fully understood now by reference to the following example in which the parts are by weight unless otherwise specified.

*Example*

Starting with empty equipment, as illustrated in the drawing, there is charged into the pre-mix tank 3000 lbs. of oleum of 45% strength and the paddle agitator 2 and the pump 16 are started up with care being taken to see that the temperature of the water in cooler 21 is above 94° F. so that the 45% oleum does not freeze. There is then added gradually 1000 lbs. of urea to provide a molal ratio of one mole of urea to one mole of sulfuric acid to one mole of sulfur trioxide. The rate of addition of the urea is so correlated to the cooling as to maintain a temperature of 96–100° F. As the urea is added the freezing point of the oleum drops rapidly. The addition of 60 lbs. of urea will drop the freezing point to 85° F. and the addition of 120 lbs. to 80° F. Thus as soon as the urea addition is started the temperature of the cooler can be dropped and the rate of addition of urea increased accordingly. The amount of oleum specified is intended to cover the paddle arms 3 and 4 and the volume of pre-reaction mixture thus produced will be substantially greater because of its lower specific gravity.

The Sigma-arm mixer is now started up. It is charged to about 10% of its capacity with 1000–1500 lbs. of dry crude sulfamic acid from a previous operation, operated until this charge is heated to a temperature of at least 180° F.

Simultaneous addition of urea and oleum is then started to the pre-reaction mixture. The strength of the oleum introduced now is increased to about 50% strength in order to provide a substantial excess of sulfur trioxide. The urea is added at a rate of about 3 lbs. per minute and the oleum at the rate to give one mole of sulfuric acid for each mole of urea. For this purpose about 3.26 lbs. of 50% oleum is required for each pound of urea. The urea is dispersed in the pre-reaction mixture and the oleum preferably introduced into the pre-reaction mixture through line 13b just before it enters into the circulating pump 16.

The rate of feed of urea and oleum is so correlated with the cooling that the temperature of 96–100° F. is maintained throughout the operation. This should be critically observed to insure safe continuous operation as it will provide a slurry of optimum viscosity for circulation through the external cooler and to minimize the undesirable effect of excess urea so that greater latitude is permissible in maintaining the urea-oleum balance during the reaction. In normal operation no difficulty will be encountered in maintaining temperatures between 96 and 100° F. because the rates of feed of urea and oleum are usually throttled down considerably to approximate the capacity of the Sigma-arm mixer.

The rate of feed of pre-reaction mixture to the Sigma-arm mixer is regulated so as to maintain a constant level in the pre-mix tank. The surplus pre-reaction mixture is added to the Sigma-arm mixer through the funnel 31 which is arranged to oscillate so as to spread the slurry over a ¼-inch mesh screen (not shown) located at the top of the mixer so as to insure uniform distribution of the pre-mix over the heel of crude material maintained in the mixer. During operation the stem and water inlets 39 and 40 are so regulated as to maintain a temperature between 190 and 210° F.

While I have disclosed my invention with reference to the particular conditions given above it will be understood that variations may be made therein without departing from the spirit and scope of the invention as long as the reaction between the oleum and urea is carried out in recycled pre-reaction mixture under conditions adapted to maintain a liquid pre-reaction mixture.

My invention is principally characterized by the fact that the reaction between oleum and urea is effected in a liquid reaction medium made up of recycled pre-reaction mixture and because of this critical control a number of operations are required in order to keep the pre-reaction mixture sufficiently liquid for recirculation.

The first of these has to do with the concentration of oleum. To obtain as the ultimate product of the reaction dry sulfamic acid requires theoretically the use of equal molar proportions. This amounts to 45% oleum. The strength of the oleum should not be below this value because at lower strength oleum the yield is greatly reduced. It is desirable, however, to use an oleum strength greater than 45% since an excess of sulfur trioxide is advantageous in several respects. First it accelerates the sulfamic acid-forming reaction thus making the conversion of the pre-reaction mixture to sulfamic acid to take place at a lower temperature so that a product of higher yield of sulfamic acid may be obtained. In the second place, it apparently acts as a buffer against adverse effects of local excesses of urea since with an excess of sulfur trioxide the urea at any time during the operation may exceed the sulfuric acid by an amount substantially equivalent to the excess sulfur trioxide without there being too much urea. Hence where it is sought to balance the urea and oleum feeds in molal proportions the feed may get considerably out of balance if there is an excess of sulfur trioxide without adversely affecting the reaction. An excess of $SO_3$ causes the pre-reaction mixture to become more viscous and reactive so that as a practical matter when the pre-reaction mixture is recycled a critical control on the upper limit of the oleum should be observed in order to provide a pre-reaction mixture which is sufficiently fluid for handling by pumps and like equipment and also sufficiently stable that it may be repeatedly recycled if desired. Thus, depending upon the capacity and capabilities of the equipment involved the strength of the oleum may range from 45% up to about 53%. A third reason in favor of an excess of $SO_3$ is that such an excess will compensate for the diluting effects of moisture in the atmosphere. It is preferred to operate within the limits of about 48 to about 50% oleum or around a 20-30% excess of $SO_3$. With this strength oleum I have been able to produce crude sulfamic acid containing 90-92% sulfamic acid whereas under the same conditions with 45-47% oleum the crude contains 86-90% sulfamic acid.

In starting up the operation it is desirable to use 45% oleum since in this manner the reactivity is kept to a minimum and a fluid slurry obtained notwithstanding the length of time required to introduce the urea into the oleum. When the reaction is proceeding normally, however, it is of advantage as, above stated, to operate with an excess sulfur trioxide. Because of the greater reactivity resulting from the use of excess sulfur trioxide it is desirable to maintain a critical control of the temperatures at 96-100° F. Temperatures above and below may be utilized but in either case the pre-reaction mixture tends to increase in viscosity and at higher temperatures foaming, resulting from the liberation of carbon dioxide gas, may result. A drop of 10° F., i. e., to about 85° F., will approximately double the viscosity of the slurry reducing the amount that can be recirculated and accordingly reducing the efficiency of the cooling. Operation at higher temperatures (104-108° F.) tends to cause excessive reaction in the pre-reaction mixture, raising the sulfamic acid content and also increasing the viscosity and causing foaming. Temperatures above 110° F. should be avoided since at such temperatures the reaction tends to become spontaneous and may become violent.

The temperature of the pre-reaction mixture is kept within the proper limits by maintaining uniform feed control while repeatedly bringing the mixture into contact with a suitably cooled surface. The cooling represents the combined effect of the water-jacket of the pre-mix tank and the cooler 21. The agitation in the pre-mix tank promotes the cooling efficiency therein and additionally maintains uniformity. As the urea is fed to the pre-reaction mixture the agitation causes it uniformly to be distributed throughout the mass. Then as this mixture is withdrawn and the oleum is introduced the pre-reaction takes place and the heat of the reaction is dissipated as the slurry passes through the cooler 21. Thus highly efficient cooling characteristic of liquid systems may be maintained by virtue of a critical temperature control.

The urea and sulfuric acid (introduced as oleum) should be so fed to the pre-reaction mixture as to maintain a substantially mole for mole balance especially when an excess of sulfur trioxide is employed. While it is possible to operate with a substantial excess of oleum, as shown by the starting up operation, yet such operation is quite critical and must be effected slowly and carefully. With the pre-reaction mixture maintained within the preferred temperature ranges the process is not sensitive to small amounts of urea or oleum even when operating at normal rates. Thus one or the other of the reagents (urea and sulfuric acid) may be present in amounts up to 15% excess for a short time without objectionably interfering with the operation. But over extended periods the ratio should be adhered to closely because otherwise the large mass of pre-reaction mixture which is maintained in process tends either to become very viscous or very unreactive.

It will be understood that the conversion of the pre-reaction mixture to sulfamic acid may be carried out in a wide variety of ways and with different apparatus. Thus instead of dispersing it on suitably temperature-controlled particles of sulfamic acid as is done in the sigma-arm mixer it may simply be fed out in a thin layer on a suitable temperature-controlled surface as a flaking drum, belt flaker or the like, or it may be converted in a graining bowl, a double screw conveyor, a rotary space reactor and like apparatus. Whatever method or apparatus is adopted care should be exercised to keep the temperature below 260° F. because of the tendency of sulfamic acid to convert to ammonium bisulfate at such a high temperature. Temperatures below 180° F. should be avoided because of the tendency toward the production of a wet product which on being heated will react with violence. Thus temperatures in the neighborhood of 200° F. are preferred.

I claim:

1. In a process for the manufacture of sulfamic acid, the steps comprising bringing together as reactants urea and oleum of at least 45% and not more than about 53% strength in proportions to supply substantially one mole of sulfuric acid for each mole of urea and cooling to suppress the formation of sulfamic acid whereby a body of liquid is obtained, withdrawing a portion of the body of liquid, cooling said portion, and returning said portion to said body of liquid, the rate of withdrawal and degree of cooling being such that said body of liquid is maintained in a continuous liquid phase and the formation of sulfamic acid is suppressed.

2. In a process for the manufacture of sulfamic acid, the steps comprising bringing together as reactants urea and oleum of at least 45% and not more than about 53% strength in proportions to supply substantially one mole of sulfuric acid for each mole of urea and cooling to suppress the formation of sulfamic acid whereby a body of liquid is obtained, withdrawing a portion of the body of liquid, cooling said portion, and returning said portion to said body of liquid, the rate of withdrawal and degree of cooling being such that said body of liquid is maintained in a continuous liquid phase and the formation of sulfamic acid is suppressed, and withdrawing another portion of said body of liquid and converting the last said portion to sulfamic acid.

3. In a process for the manufacture of sulfamic acid, the steps comprising bringing together as reactants urea and oleum of at least 45% and not more than about 53% strength in proportions to supply substantially one mole of sulfuric acid for each mole of urea and cooling to suppress the formation of sulfamic acid whereby a body of liquid is obtained, withdrawing a portion of the body of liquid, cooling said portion, and returning said portion to said body of liquid, the rate of withdrawal and degree of cooling being such that said body of liquid is maintained in a continuous liquid phase at a temperature of about 85° F. to 110° F. thereby suppressing the formation of sulfamic acid, and withdrawing another portion of said body of liquid and converting the last said portion to sulfamic acid.

4. In a process for the manufacture of sulfamic acid, the steps comprising bringing together as reactants urea and oleum of at least 48% and not more than 50% strength in proportions to supply substantially one mole of sulfuric acid for each mole of urea to form a liquid in a main body of liquid which has been similarly formed from said reactants in said proportions by cooling to suppress the formation of sulfamic acid, withdrawing a portion of the main body of liquid, cooling said portion and returning said portion to said main body of liquid, the rate of withdrawal and the degree of cooling being such that said body of liquid is maintained in a continuous liquid phase at a temperature of about 96° F. to 100° F., thereby suppressing the formation of sulfamic acid, and withdrawing another portion of said body of liquid and heating to convert the last said portion to sulfamic acid.

5. In a process for the manufacture of sulfamic acid, the steps comprising bringing together as reactants urea and oleum of at least 45% and not more than 50% strength in proportions to supply substantially one mole of sulfuric acid for each mole of urea to form a liquid in a main body of liquid which has been similarly formed from said reactants in said proportions by cooling to suppress the formation of sulfamic acid, the rate of addition of the reactants to said main body of liquid being regulated to keep the temperature of said main body of liquid below about 100° F. thereby suppressing the formation of sulfamic acid, withdrawing a portion of the main body of liquid, cooling said portion, and returning said portion to said main body of liquid, the rate of withdrawal and the degree of cooling being such that said body of liquid is maintained in a continuous liquid phase at a temperature above about 96° F., and withdrawing another portion of said body of liquid and heating to convert the last said portion to sulfamic acid.

JAMES W. LEONARD.